C. R. HORNE.
NOZZLE.
APPLICATION FILED SEPT. 25, 1920.
1,398,133. Patented Nov. 22, 1921.
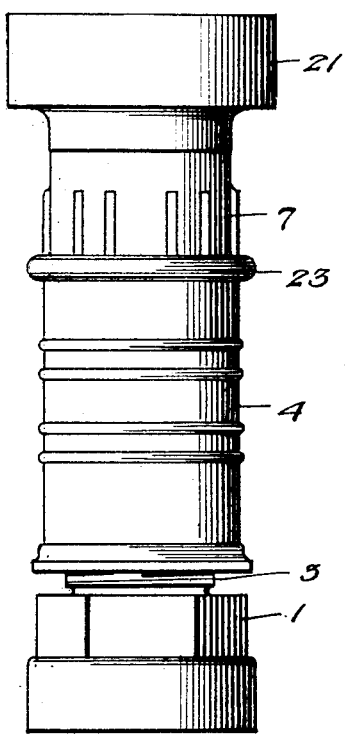
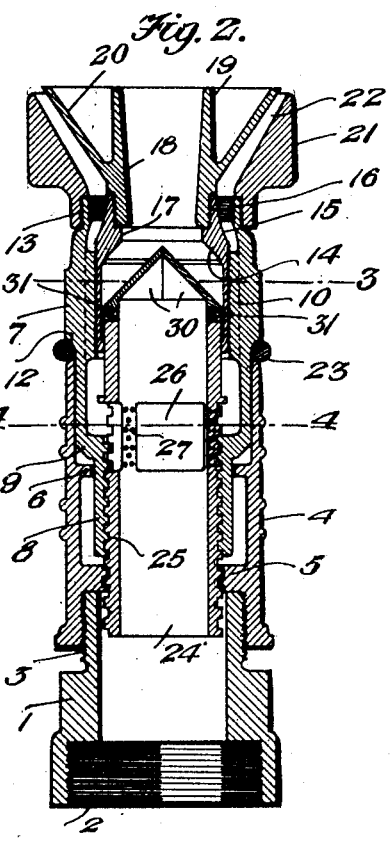
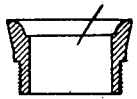
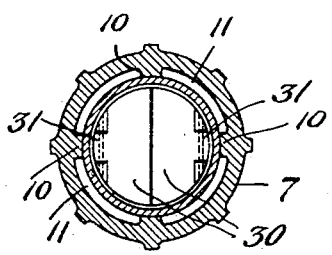
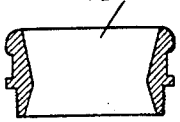
Carl R. Horne
INVENTOR
by Victor J. Evans
ATTORNEY

UNITED STATES PATENT OFFICE.

CARL R. HORNE, OF PHILADELPHIA, PENNSYLVANIA, ASSIGNOR TO MARY J. HOLMES, OF PHILADELPHIA, PENNSYLVANIA.

NOZZLE.

1,398,133.  Specification of Letters Patent.  Patented Nov. 22, 1921.

Application filed September 25, 1920. Serial No. 412,733.

*To all whom it may concern:*

Be it known that I, CARL R. HORNE, a citizen of the United States, residing at Philadelphia, in the county of Philadelphia and State of Pennsylvania, have invented new and useful Improvements in Nozzles, of which the following is a specification.

The object of my present invention is the provision of a nozzle, designed more especially, through not necessarily, for use on a fire extinguishing hose, and possessed of certain features and capacity of adjustment whereby a large spray and stream may be emitted, a small spray and stream may be emitted, or a straight solid stream alone may be emitted as occasion demands.

To the attainment of the foregoing the invention consists in the improvement as hereinafter described and definitely claimed.

In the accompanying drawings, hereby made a part hereof:—

Figure 1 is a side elevation of the nozzle constituting the best practical embodiment of my invention of which I am cognizant.

Fig. 2 is a diametrical section of the same.

Figs. 3 and 4 are transverse sections taken in the planes indicated by the lines 3—3 and 4—4, respectively, of Fig. 2.

Figs. 5, 6 and 7 are detail diametrical sections of alternate elements for use in the nozzle as hereinafter explicitly pointed out.

Similar numerals designate corresponding parts in Figs. 1 to 4 to which reference will first be made.

Among other elements my improved nozzle comprises a rear tubular section 1, interiorly threaded at 2 for connection to a hose nipple or the like and reduced and exteriorly threaded as indicated by 3. Threaded on the said inner section 1 is a union 4 that is characterized by an interior annular threaded flange 5, and is also characterized by an interior plain flange 6; the said flanges 5 and 6 being spaced apart as illustrated. Disposed in the outer portion of the union 4 is an intermediate tubular section 7. This latter is characterized by an inner, interiorly threaded reduced portion 8, by an exterior shoulder 9, by interior longitudinal ribs 10, Figs 2 and 3, separated by intervening arcuate spaces 11, by an exterior shoulder 12 and by an exteriorly threaded outer end portion 13. The inner surfaces of the ribs 10 are threaded as appears in Fig. 2 to provide for the adjustable connection of an exteriorly threaded tubular member 14 the outer end portion of which is exteriorly tapered as indicated by 15, and which is provided with a threaded bore 16 and an abutment 17 at the inner end of said bore. The bore 16 is for the connection of the inner water directing member 18, the end portion of which is exteriorly threaded and shouldered as illustrated. The said member 18 includes a central tubular portion 19 and an outwardly flared portion 20, preferably in the form of a flange as illustrated. For coöperation with the intermediate member 7 and the member 18 I provide the exterior annular water directing member 21. This latter is provided with a taper bore 22 for use in spaced relation to the flange 20 and is also provided with an inner interiorly threaded portion for detachable connection to the outer threaded end of the section 7. Surrounding the section 7 and interposed between the shoulder 12 thereof and the outer end of the union 4 is a gasket 23, preferably of circular form in cross sction. In addition to the elements enumerated my novel nozzle includes an innermost tubular member 24, exteriorly threaded at 25 to engage the threaded flange 5 as well as the interior thread of the intermediate member 7. At an intermediate point of its length the said tubular member 24 is provided with alternate large openings 26 and sets of foraminations 27, Figs. 2 and 4, each of the said foraminations being minute as illustrated. At its outer end the member 24 is equipped with semi-conical shutters 30, the said shutters 30 being hinged at 31 to the member 24 and being designed to be open by a head of water passing outwardly through the member 24. The extent to which the said shutters 30 can be opened in the manner stated is controlled by the interior shoulder of the member 14, said member 14 being adjustable in the member 7 by reason of the thread mode of connection before described. In this way the volume of the solid stream emitted through the tube 19 may be nicely regulated, and in this connection it will be understood that incident to inward movement of the member 14, the member 18 will also be moved inward so that the annular space between the taper wall 22 and the flange 20 will be diminished in width consonant with the extent to which the shutters 30 can be opened under the action of a head of water. It will also be understood that incident to the use of the nozzle water passes from the interior of the tubular member 24 through the openings 26 and the foraminations 27 to the interior of the intermediate section 7 and then finds its way through the spaces 11 to the space between the inner and outer water directing elements. From this it follows that through the medium of my novel nozzle a large spray and stream may be discharged or a small spray or stream or a solid central stream alone.

In Figs. 5, 6 and 7 I illustrate water directing inner elements 19ᵃ, 19ᵇ and 19ᶜ, respectively, any one of which may be employed within the element 21 and in lieu of the inner water directing element shown in Fig. 2, as occasion demands.

Having thus described my invention, what I claim and desire to secure by Letters-Patent, is:—

1. In a nozzle, a tubular member having an opening at an intermediate point of its length for the emission of water and also having movable control means at the outer end of said member, in combination with means surrounding the tubular member and having longitudinal passages to receive water from said intermediate opening and a discharge in communication with said passages, and endwise adjustable tubular means in said surrounding means and equipped to control the discharge thereof and having an interior tapered portion arranged to limit the opening of said movable control means.

2. In a nozzle, a tubular member having an opening at an intermediate point of its length for the emission of water and also having movable control means at the outer end of said member, in combination with means surrounding the tubular member and having longitudinal passages to receive water from said intermediate opening and a discharge in communication with said passages, and endwise adjustable tubular means in said surrounding means and equipped to control the discharge thereof and having an interior tapered portion arranged to limit the opening of said movable control means; the said control means of the first-named tubular member being in the form of semi-conical pivoted shutters, and the interior tapered portion of the endwise adjustable tubular means being opposed to the said shutters.

3. A nozzle comprising an outer member having an interior threaded flange, an inner tubular member threaded in said flange and having openings intermediate of its ends, semi-conical shutters hinged to the outer end of said tubular member, a second outer member threaded on the threaded tubular member and having an exterior shoulder and also having interior longitudinal passages, a gasket interposed between the outer first-named member and the second-named outer member, an annular water directing member threaded on the outer end of the second-named outer member, an inner water directing member having a central tubular portion and also having an outwardly flared portion, and a tubular member connected to the inner water directing member and threaded in the second-named outer member and having an interior tapered portion opposed to the said shutters.

In testimony whereof I affix my signature.

CARL R. HORNE.